United States Patent
Wiggers (10) Patent No.: US 8,692,503 B2
(45) Date of Patent: Apr. 8, 2014

(54) HOMING AND ESTABLISHING REFERENCE FRAMES FOR MOTION AXES IN RADIATION SYSTEMS

(75) Inventor: Robert T. Wiggers, Belmont, CA (US)

(73) Assignee: Varian Medical Systems, Inc., Palo Alto, CA (US)

( * ) Notice: Subject to any disclaimer, the term of this patent is extended or adjusted under 35 U.S.C. 154(b) by 913 days.

(21) Appl. No.: 12/641,538

(22) Filed: Dec. 18, 2009

(65) Prior Publication Data

US 2011/0148339 A1 Jun. 23, 2011

(51) Int. Cl.
*G05G 5/00* (2006.01)

(52) U.S. Cl.
USPC .......................................... 318/626; 318/560

(58) Field of Classification Search
USPC .................................................. 318/560, 626
See application file for complete search history.

(56) References Cited

U.S. PATENT DOCUMENTS

| | | | | |
|---|---|---|---|---|
| 5,237,250 | A | * | 8/1993 | Zeile et al. ..................... 318/562 |
| 5,872,434 | A | * | 2/1999 | Hill ................................. 318/159 |
| 6,075,334 | A | * | 6/2000 | Sagues et al. ............. 318/568.11 |
| 6,242,879 | B1 | | 6/2001 | Sagues et al. |
| 6,304,051 | B1 | | 10/2001 | Sagues et al. |
| 6,323,616 | B1 | | 11/2001 | Sagues et al. |
| 7,489,765 | B2 | * | 2/2009 | Yi ................................... 378/151 |
| 7,816,881 | B2 | * | 10/2010 | Wiegers et al. ................ 318/638 |
| 8,114,256 | B2 | * | 2/2012 | Chang et al. .............. 204/192.13 |
| 2003/0030405 | A1 | * | 2/2003 | Branecky ........................ 318/701 |
| 2005/0077855 | A1 | * | 4/2005 | Hochhalter et al. ........... 318/567 |
| 2006/0138977 | A1 | * | 6/2006 | Kircanski et al. ............. 318/135 |
| 2006/0176007 | A1 | * | 8/2006 | Best ............................... 318/685 |
| 2007/0206727 | A1 | * | 9/2007 | Yi ................................... 378/150 |
| 2008/0012522 | A1 | * | 1/2008 | Wiegers et al. ................ 318/638 |
| 2009/0189558 | A1 | * | 7/2009 | Ford et al. ................. 318/400.38 |
| 2011/0051899 | A1 | * | 3/2011 | Schumacher et al. ......... 378/123 |
| 2011/0056344 | A1 | * | 3/2011 | Dick et al. .......................... 83/13 |
| 2011/0061441 | A1 | * | 3/2011 | Ko .................................. 73/1.79 |
| 2011/0074288 | A1 | * | 3/2011 | Mohr et al. ................... 315/5.41 |
| 2011/0075815 | A1 | * | 3/2011 | Brown et al. .................. 378/125 |
| 2012/0087478 | A1 | * | 4/2012 | Brown et al. .................. 378/156 |

* cited by examiner

*Primary Examiner* — Kawing Chan
(74) *Attorney, Agent, or Firm* — Houst Consulting (57) ABSTRACT

A method of homing motion axes in a radiation system uses a motor and one or more hardstops. A load is driven by a motor to move toward a hardstop during which an electrical parameter of the motor is monitored. A reference position for the motion axis is defined when the monitored electrical parameter reaches or exceeds a determined value. Alternative to monitoring the motor electrical parameter, the motor velocity may be monitored during the motion and a reference position for the motion axis is defined when the monitored motor velocity falls to or below a determined value. Alternatively, the load velocity may be monitored during the motion and a reference position for the motion axis is defined when the monitored load velocity falls to or below a determined value.

9 Claims, 8 Drawing Sheets

HOMING AND ESTABLISHING REFERENCE FRAMES FOR MOTION AXES IN RADIATION SYSTEMS

CROSS REFERENCE TO RELATED APPLICATIONS

This application is related to U.S. application Ser. No. 12/551,059 entitled "Target Assembly with Electron and Photon Windows" filed Aug. 31, 2009, U.S. application Ser. No. 12/568,619 entitled "Beam Filter Positioning Device" filed Sep. 28, 2009, and U.S. application Ser. No. 12/568,621 entitled "Energy Switch Assembly for Linear Accelerators" filed Sep. 28, 2009, the disclosures of all of which are incorporated herein by reference in their entirety.

BACKGROUND

This invention relates generally to radiation systems and methods and in particular to methods of homing and establishing reference frames for motion axes in radiation systems.

Many machines are designed with computer controlled axes or mechanisms which use motors, feedback devices, and sensors to move the axes to precise positions. In cases where an axis includes a relative feedback device which does not have an absolute position throughout the range of the axis motion, the current axis position is not known when power is applied to the system. It is then necessary to move the axis toward a known position and precisely detect this position to establish a home or reference position. Once the reference position is established, the axis can be commanded to move to an accurate location.

In the art a routine for establishing an axis home or reference position is referred to as homing. One conventional homing approach involves the use of home sensors or switches in which an axis is moved toward a home sensor and a reference position is initialized solely based upon triggering this home sensor. This approach typically does not provide good precision since most sensors only trigger with limited accuracy. Further, when only a single home sensor is used, any movement of the sensor such as caused by loose mounting screws will affect the axis positioning.

Another conventional homing approach involves the use of a feedback device and a home switch located at a known location. Either the home switch is used as the reference along with a current position of the feedback device, or once the home switch is triggered, the first index pulse of the feedback device is captured and used as the reference position. An "index pulse" is a single digital signal which a feedback device sends at the exact same rotational angle of the feedback device. In this approach the precision is determined by the combination of the home switch and the index pulse of the feedback device. If either the home switch or the index pulse of the feedback device is moved, the reference location is wrong.

Radiation systems such as medical linear accelerators include various motion axes that operate to produce treatment beams and position patients or other units such as imaging devices. Because of the high radiation environment it would be beneficial to minimize the number of electronic components and simplify the design for robust and reliable homing. For safety of radiation therapy it would be desirable to provide for a homing routine or a checkout that can verify that the correct home position is found in the homing routine to avoid single points of failure. It would be beneficial to establish reference frames for various motion axes of a radiation system that can be automatically calibrated such that the components of the motion axes can be serviced or replaced without the need for retuning of the system after the service or replacement. There is a greater need for reliable homing methods by which high-precision, highly-repeatable, and very durable reference positions can be established for various motion axes in radiation systems.

SUMMARY

In one aspect the present invention provides methods of homing a motion axis in a radiation system which includes a motor, a load, a feedback device, and one or more hardstops. According to the provided homing method, the load is driven by the motor to move toward a hardstop, and an electrical parameter of the motor is monitored during the motion, which would reach or exceed a determined value when at least a portion of the load contacts the hardstop. The value of the feedback device is captured when the monitored electrical parameter or motor velocity or load velocity reaches or exceeds the determined value. A reference position for the motion axis is defined based on the captured value of the feedback device. Alternative to monitoring the motor electrical parameter, a feedback device coupled to the motor or the load can be monitored for a reaction when at least a portion of the load contacts the hardstop. In this case the velocity of motion is determined from the feedback device, which would fall to or below a determined value when at least a portion of the load contacts the hardstop. A reference position for the motion axis is defined when the monitored motor velocity or load velocity falls to or below the determined value.

The load of the axis can be a device or an assembly such as an energy switch assembly, a target assembly, a filter positioning device assembly, an ion chamber assembly, and collimation assembly, or a structural body supporting the described assembly or device. The load of the axis may also be a treatment couch top, a treatment couch base, or a positioning device for an imaging detector and/or source. The axis may be a linear axis which is operable to move the load in a linear direction. The axis may also be a rotational axis which is operable to move the load in an angular direction.

In another aspect the present invention provides a method of homing a motion axis in a radiation system which includes a motor, a load, a feedback device, and at least two hardstops. According to the provided method, the value of distance or angle between a first hardstop and a second hardstop is provided. The motion axis is moved toward the first hardstop to perform a first homing routine by contacting the first hardstop, whereby a first reference position of the motion axis is established. The motion axis is then moved toward the second hardstop to perform a second homing routine by contacting the second hardstop, whereby a second reference position of the motion axis is established. The value of distance or angle between the established first and the second reference positions is calculated and compared with the provided value of distance or angle between a first hardstop and a second hardstop. The first and second reference positions for the motion axis are accepted if the calculated value and the provided value agree.

During the first and/or second homing routines, the motor current may be monitored when the axis contacts the first and/or second hardstops. The first and/or second reference positions may be defined when the motor current reaches or exceeds a determined value. Alternatively, the motor velocity may be monitored during the first and second homing routine. The first and/or second reference positions may be defined when the motor velocity falls to or below a determined value. Alternatively, the load velocity may be monitored during the first and second homing routine. The first and/or second reference positions may be defined when the load velocity falls to or below a determined value.

In some embodiments, the motion axis may include one or more limit switches near the first and/or second hardstops and the value of distance or angle of the one or more limit switches from the first or second hardstop may be provided by an initial calibration routine. During the first or second homing routines the positions of the one or more limit switches may be captured and the distance or angle between the captured position of the one or more limit switches and the established first or second reference position is calculated and compared with the provided value. The first and second reference positions for the motion axis are accepted if the calculated value and the provided value agree.

In another aspect the present invention provides methods of establishing a reference frame for a motion axis in a radiation system which includes a motor, a load, a feedback device, and one or more hardstops. According to the provided method, the load is driven by the motor to move toward a hardstop, and an electrical parameter of the motor is monitored during the motion, which would reach or exceed a determined value when at least a portion of the load contacts the hardstop. An origin of a reference frame for the motion axis is defined when the monitored electrical parameter reaches or exceeds a determined value. Alternative to monitoring the motor electrical parameter, the motor velocity may be monitored during the motion, which would fall to or below a determined value when at least a portion of the load contacts the hardstop. An origin of a reference position for the motion axis is defined when the monitored motor velocity falls to or below the determined value. Alternatively, the load velocity may be monitored during the motion, which would fall to or below a determined value when at least a portion of the load contacts the hardstop. An origin of a reference position for the motion axis is defined when the monitored load velocity falls to or below the determined value.

In a further aspect of the invention a radiation system is provided. The radiation system includes a motion axis including a motor, a load drivingly coupled to the motor, and one or more feedback devices coupled to the motor, one or more hardstops defining an end-of-travel of the motion axis, and a controller programmed to detect a contact of at least a portion of the load with the one or more hardstops.

The controller may be programmed to monitor the electrical parameters of the motor and detect a change of a monitored electrical parameter when at least a portion of the load contacts the one or more hardstops. The controller may also be programmed to monitor the motor velocity and detect a change of the motor velocity when at least a portion of the load contacts the one or more hardstops. Alternatively, the motor may be programmed to monitor the load velocity and detect a change of the load velocity when at least a portion of the load contacts the one or more hardstops.

In some embodiments, the radiation system may further include one or more limit switches located near the one or more hardstops. The limit switches signal the controller that the motion axis approaches an end-of-travel when they are triggered.

The motion axis may be a linear axis or a rotational axis operable to move a load in a linear or an angular direction. The load may be an energy switch assembly, a target assembly, a filter positioning device assembly, an ion chamber assembly, or a collimation assembly. The load may also be a treatment couch top, a couch base, or a positioning device for an imaging detector and/or source. The feedback device may be a relative position feedback device coupled to the motor. The axis may also include a feedback device that is connected to the load.

BRIEF DESCRIPTION OF THE DRAWINGS

These and various other features and advantages will become better understood upon reading of the following detailed description in conjunction with the accompanying drawings and the appended claims provided below, where:

DETAILED DESCRIPTION OF VARIOUS EMBODIMENTS

Various embodiments of homing and establishing reference frames for motion axes in radiation systems are described. It is to be understood that the invention is not limited to the particular embodiments described as such may, of course, vary. An aspect described in conjunction with a particular embodiment is not necessarily limited to that embodiment and can be practiced in any other embodiments. For instance, while various embodiments are described in connection with a linear accelerator, it will be appreciated that the invention can also be practiced in other electromagnetic apparatuses and modalities. It is also to be understood that the terminology used herein is for the purpose of describing particular embodiments only, and is not intended to be limiting since the scope of the invention will be limited only by the appended claims, along with the full scope of equivalents to which such claims are entitled.

In addition, various embodiments are described with reference to the figures. It should be noted that the figures are not drawn to scale, and are only intended to facilitate the description of specific embodiments. They are not intended as an exhaustive description or as a limitation on the scope of the invention.

All technical and scientific terms used herein have the same meaning as commonly understood by one of ordinary skill in the art to which this invention belongs, unless defined otherwise. Various relative terms are used in the description and appended claims such as "on," "upper," "above," "over," "under," "top," "bottom," "higher," and "lower" etc. These relative terms are defined with respect to the conventional plane or surface being on the top surface of the structure, regardless of the orientation of the structure, and do not necessarily represent an orientation used during manufacture or use. The following detailed description is, therefore, not to be taken in a limiting sense. As used in the description and appended claims, the singular forms of "a," "an," and "the" include plural references unless the context clearly dictates otherwise. Thus, for example, reference to "a feedback device" includes one or more feedback devices.

As used herein, the term "motion axis" or "axis" refers to a mechanism that is operable to move an object in a direction. For example, a "linear axis" refers to a mechanism that is operable to move an object in a linear direction. A "rotational axis" refers to a mechanism that is operable to rotate an object in an angular direction. In some embodiments, an axis may include a motor, a load drivingly coupled to motor, and one or more feedback devices that provide position and/or velocity signals.

As used herein, the term "hardstop" refers to a fixed structural feature of a system that defines an end-of-travel of a motion axis.

The present invention provides a hardstop homing method using a motor and a feedback device. Home sensors or switches are not required although they can be used. The method is performed by moving an axis toward a known end-of-travel position or hardstop. During this motion, the motor's electrical parameters such as the motor current, back electromagnetic force (EMF) etc. or motor feedback device can be monitored by a controller. Once the electrical parameter of the motor or a condition of the feedback device exceeds a given value for a given duration of time, the axis position is captured and reset on the feedback. At this point, the axis has established the reference position and subsequent motion can be monitored by reading further signals from the feedback device. An alternative to monitoring the motor electrical parameters or motor feedback is to monitor the load driven by the motor. While the axis is moving, a feedback device coupled to the load is monitored. When the feedback device registers no motion for a given duration of time, the reference position is established and the axis position is captured by the feedback device.

Figure 1:
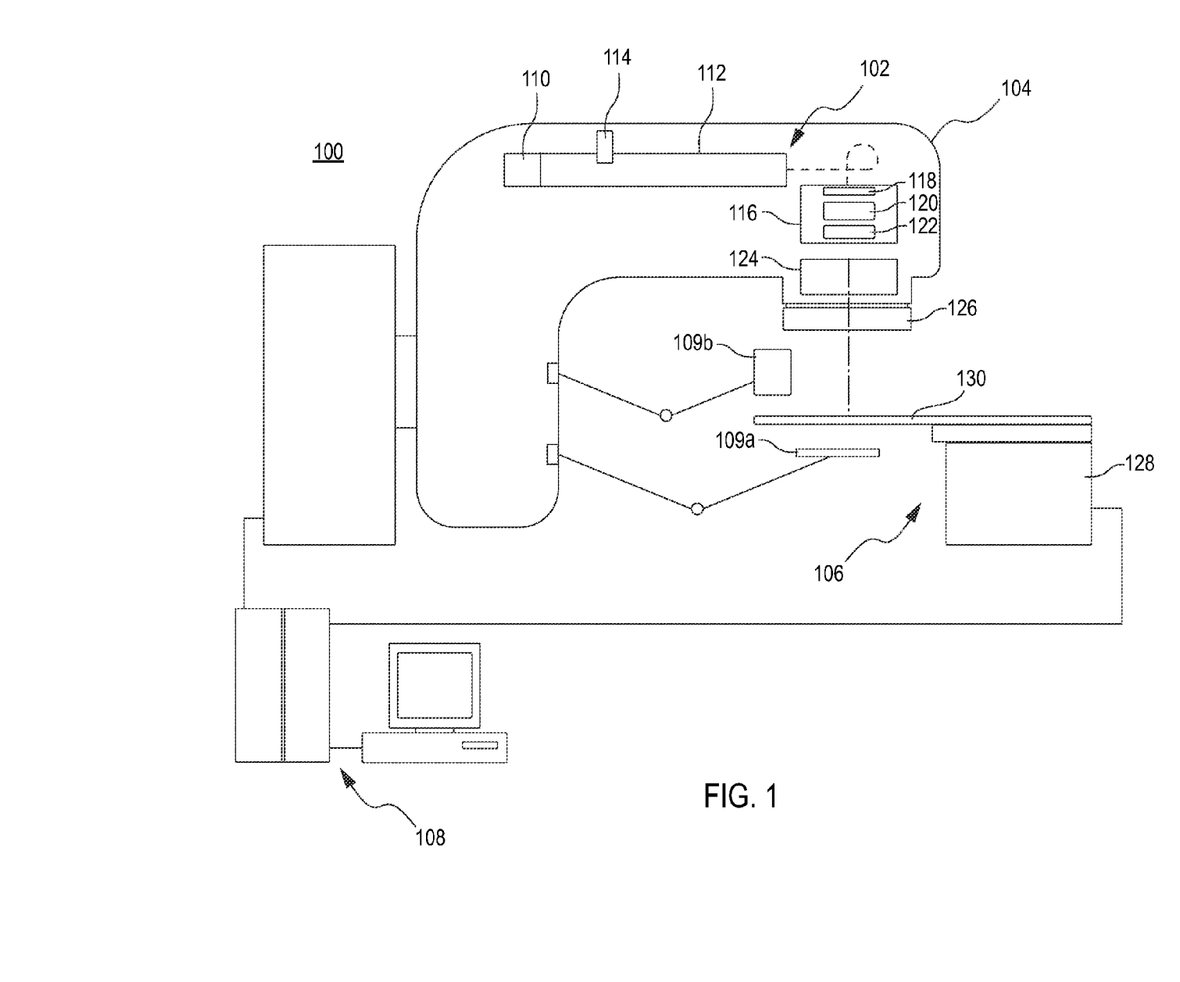
FIG. 1 is a schematic illustrating an exemplary linear accelerator in accordance with some embodiments of the invention.

FIG. 1 schematically shows an exemplary linear accelerator system 100 that can embody the principle of the invention. The accelerator system 100 includes various axes or mechanisms that are operable to move or position various devices or assemblies in production of treatment beams or support of a patient or imaging units etc. In general, the accelerator system 100 includes an accelerator 102, which may or may not be enclosed in a gantry 104, a treatment couch 106, a controller 108, and optionally, various units or devices for imaging 109. An electron gun 110 produces and injects electrons into an accelerator guide 112, which may have a plurality of accelerating cavities coupled with pulsed microwave energies. An energy switch assembly 114 may be mounted to the accelerator guide 112 operable to modulate the energy levels of output electron beams. The energy switch assembly 114 may be moved with a linear axis to position a metallic probe in a side cavity of the accelerator guide 112. The insertion of a metallic probe into the side cavity changes the geometry of the cavity, thereby altering the electromagnetic fields which couple to the side cavity and adjacent accelerating cavities. This in turn alters the energy level of the electron beam downstream from the energy switch assembly 114. By moving and precisely positioning a metallic probe in a side cavity of the accelerator guide, the energy level of an output beam can be controlled.

The output electron beam, which may or may not be bent by a bending magnet, is directed to a treatment head 116. The treatment head 116 houses various devices or assemblies such as a target assembly 118, a beam filter assembly 120, and an ion chamber assembly 122 etc. that are configured to produce, shape, or monitor treatment beams. The target assembly 118 may be moved either with a linear axis or a rotational axis which is operable to position a target relative to a beam line. For example, in a photon mode a linear or rotational axis may move to position a target in the beam path for generation of radiation. In an electron mode, the linear or rotational axis may remove the target out of the beam path to allow an electron beam to pass unimpeded.

The beam filter assembly 120 supports one or more photon flattening filters and one or more electron scattering foils. The beam filter assembly 120 may be moved with one or more motion axes to position a photon flattening filter or electron scattering foil relative to the beam path. For instance, two linear axes may move the beam filter assembly 120 e.g. in X-Y directions to position a photon flattening filter or an electron scattering foil. Alternatively, one linear axis and one rotational axis, or two rotational axes may be used to move the beam filter assembly 120 in positioning a photon flattening filter or an electron scattering foil. In an exemplary embodiment, the beam filter assembly 120 may include a stage and a filter-foil plate supported by the stage configured to support one or more photon flattening filters and one or more electron scattering foils. A linear axis moves the stage and thus the filter-foil plate supported by the stage in a linear direction. A rotational axis, which may be supported by the stage, is operable to rotate the filter-foil plate in an angular direction. The use of two motion axes such as a rotational axis and a linear axis makes it practical to place the electron scattering foils and photon flattening filters on different radii of a plate. For instance, the electron scattering foils may be positioned at locations proximate to the periphery of the plate, and the photon flattening filters may be positioned at locations proximate to the midpoint of the radius of the plate. To position the filters and foils at two different radii provides a number of advantages. It allows for a greater number of filters or foils available at two radii, as compared to confining both the filters and foils at a same radius. A greater selection of filters and foils may allow for a greater selection of X-ray and electron energies. It makes possible that the large piece of radiation shielding located around the photon flattening filters to be absent when using electron scattering foils in electron modes. The absence of the radiation shielding improves the performance in electron modes by reducing scatter. It also allows for a smaller inner radius for the flattening filters. A smaller inner radius of the filter travel path would introduce a greater curvature in the shielding gaps, hence substantially reducing the direct radiation leakage paths which would otherwise require heavy and expensive shielding plugs.

The ion chamber assembly 122 may be moved with a linear axis or rotational axis to position an ion chamber relative to the beam path for detecting the parameters of a treatment beam such as beam energy, dose distribution, and dose rate etc. In a photon mode operation the ion chamber is positioned under a photon flattening filter for detection of the parameters of a radiation beam. In an electron mode operation the ion chamber is positioned under an electron scattering foil in the beam centerline for detection of the parameters of an electron beam.

While not shown in FIG. 1, the treatment head 116 may also include additional functional devices or assemblies. The additional devices or assemblies may be moved with additional motion axes, or alternatively, moved by one or more linear or rotational axes that are described above. For example, the treatment head 116 may further include a field light assembly that is operable to move a light source and/or a mirror to provide simulation of treatment field. The mirror and the light source components may be moved by a beam filter axis or the ion chamber axis respectively which have been described above. In a light field mode operation the beam filter axis and ion chamber axis move coordinately to adjust the position of the light source and mirror to optically project the light source to a virtual position coincident with the same location of the radiation source. As such the three degree of freedom (X, Y, and Z) adjustment of the virtual light source can be accomplished by mounting the mirror and light sources on motion axes already needed for other purposes. Additional motion axes may be used but not required to achieve the three degree of freedom adjustment. The beam filter axes or ion chamber axis described above may also move other functional components. For instance, the ion chamber axis may also move a backscatter filter to block backscattered radiation, which may have unwanted effects on the calibration of the ion chamber.

The collimation assembly 124 may include upper collimator jaws and lower collimator jaws each of which may be moved by a linear or rotational axis to provide secondary collimation. The linear or rotational axes for the lower or upper collimator jaws may be independently controlled. The upper and lower collimator jaws may be housed in an enclosure and rotated by a rotational axis. A multileaf collimator (MLC) 126 may include a plurality of individual leaves made of high atomic numbered material such as tungsten each of which may be moved with a linear axis. By moving each individual collimator leave into different positions in a controlled manner, the size and shape of the treatment beam can be controlled, which assists in achieving conformal radiotherapy and intensity modulated radiation therapy (IMRT).

The treatment couch 106 on which a patient can be supported or positioned may include a base 128 and a couch top 130. Linear axes may move the couch top 130 in the lateral (x-axis) and/or longitudinal (y-axis) directions. Linear axis may also move the base 128 vertically so that the couch top 130 may be moved in the vertical directions (z-axis). Rotational axes may rotate the couch 106 about an isocenter to provide a different couch angle relative to the radiation source, or rotate the couch top 130 to provide pitch and/or roll rotation of the couch top 130.

The accelerator system 100 may optionally include units or devices for imaging such as detectors 109a and kV or mV sources 109b. Various linear and/or rotational axes may be used to move the sources and detectors in linear and/or angular directions.

The control system or controller 108 controls the operation of the linear accelerator system 100, preferably with a computer software interface such as a Graphical User Interface (GUI). The controller 108 may include a memory and a processor such as for example, a digital signal processor (DSP), a field programmable gate array (FPGA), a central processing unit (CPU), or a microprocessor (µP). The memory serves to store programs or algorithms including servo loop control algorithms and other programs for operation of various motion axes. Servo loop control algorithms may include velocity control, position control, torque control, or PID etc. The processor executes the program and generates signals for operation of the motion axes and other devices or assemblies of the accelerator system. By way of example, responsive to the commands from the controller 108, one or more motion axes move one or more devices or assemblies such as an energy switch, a target, a beam filter, field light units, a treatment couch, imaging units etc. in a controlled and automatic manner based on a plan or routine, or based on an input from a user. The controller 108 receives signals from position feedback devices or from other devices such as the ion chamber, and generates commands for adjustment when necessary. For example, based on the beam parameter signals provided by the ion chamber to the controller 108, the controller 108 may recalculate and generate commands for adjustment to various motion axes. The motion axes respond and automatically adjust the positions e.g. of the energy switch, target, beam filters, or collimators etc. For example, based on the field light image or information, the controller 108 may recalculate and generate commands for adjustment to various motion axes. The motion axes respond and automatically adjust the position of the light source and/or mirror to adjust the virtual light source position in three degrees of freedom.

Figure 2:
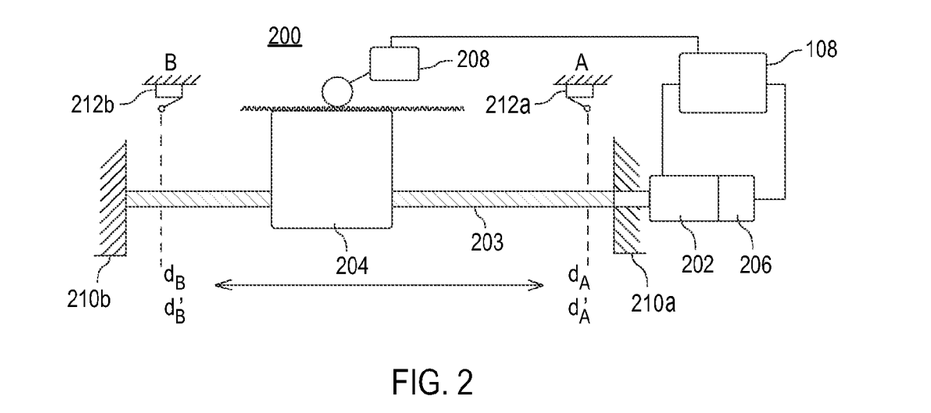
FIG. 2 is a schematic illustrating an exemplary linear axis in accordance with some embodiments of the invention.

FIG. 2 illustrates an exemplary linear motion axis 200 which can embody the principle of the invention. The linear motion axis 200 may include a motor 202, a load 204 drivingly coupled to the motor 202, and one or more feedback devices 206, 208. The load 204 may be an energy switch assembly, a target assembly, a beam filter assembly, an ion chamber assembly, a collimation assembly, or a MLC assembly. The load 204 may also be a treatment couch, or various other devices or units as illustrated in FIG. 1, or a structural body supporting one or more of the described devices or assemblies. The feedback device 206 may be coupled to the motor shaft to provide feedback signals which may be used to measure the position and/or velocity of the motor. The feedback device 208 may be coupled to the load 204 to provide feedback which may be used to detect the position and/or velocity of the load. In some embodiments, one or more feedback devices may be coupled to the motor 202 and/or one or more feedback devices coupled to the load 204 respectively to provide feedback on the position and/or velocity of the motor and the load respectively. In some embodiments, two or more feedback devices may be coupled to the motor 202 each of which may independently provide feedback on the position and/or velocity of the motor. In some embodiments, two or more feedback devices may be coupled to the load 204 each of which may independently provide feedback on the position and/or velocity of the load. The motor 202 and feedback devices 206, 208 may be electrically coupled to the controller 108. Structural features 210a, 210b define the end-of-travel of the linear axis 200 and the range of travel of the axis. In some embodiments, the structural features 210a, 210b are fixed structures or hardstops the locations of which will not be changed for the life of the system. In some embodiments, the linear axis 200 may optionally include limit switches or limit sensors 212a, 212b located near the hardstops 210a, 210b, which when triggered signal the controller 108 that the axis is approaching an end of travel. The controller 108 may then reduce the axis speed and lower the peak torque capacity of the motor to avoid collision damage to the axis and increase positioning accuracy.

Figure 3:
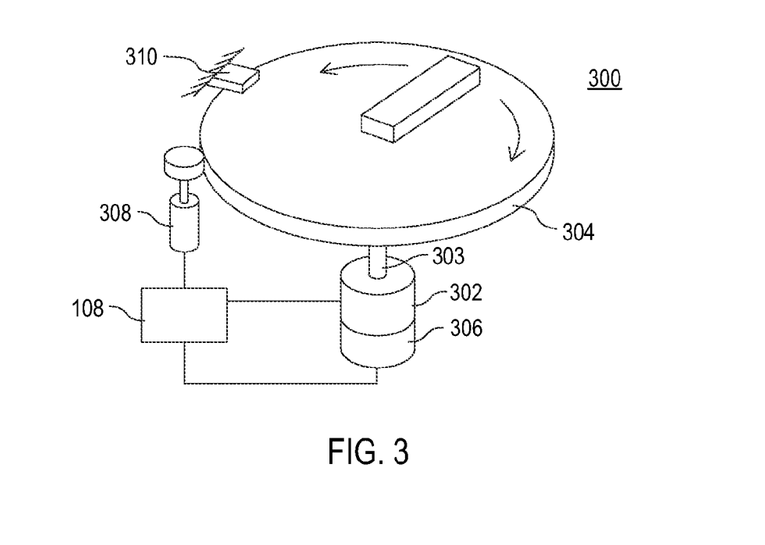
FIG. 3 is a schematic illustrating an exemplary rotational axis in accordance with some embodiments of the invention.

FIG. 3 illustrates an exemplary rotational motion axis 300 which can embody the principle of the invention. The rotational motion axis 300 may include a motor 302, a load 304 drivingly coupled to the motor 302, and one or more feedback devices 306, 308. The load 304 may be an energy switch assembly, a target assembly, a beam filter assembly, an ion chamber assembly, a collimation assembly, or a MLC assembly. The load 304 may also be a treatment couch, or various other devices or units as illustrated in FIG. 1, or a structural body supporting one or more of the described devices or assemblies. The feedback device 306 may be coupled to the motor 302 to provide feedback signals which may be used to measure the position and/or velocity of the motor. The feedback device 308 may be coupled to the load 304 to provide feedback signals which may be used to detect the position and/or velocity of the load. In some embodiments, one or more feedback devices may be coupled to the motor 302 and/or one or more feedback devices coupled to the load 304 respectively to provide feedback on the position and/or velocity of the motor and the load respectively. In some embodiments, two or more feedback devices may be coupled to the motor 302 each of which may independently provide feedback on the position and/or velocity of the motor. In some embodiments, two or more feedback devices may be coupled to the load 304 each of which may independently provide feedback on the position and/or velocity of the load. The motor 302 and feedback devices 306, 308 may be electrically coupled to the controller 108. Structural features 310 define the end-of-travel of the linear axis 300 and the range of travel of the axis. In some embodiments, the structural features 310 are fixed structures or hardstops the locations of which will not be changed for the life of the system. As used herein, the structural features 310 can be two independent or separate hardstops, or one hardstop with two hard contact surfaces. In some embodiments, the rotational axis 300 may optionally include limit switches or limit sensors (not shown in FIG. 3) located near the hardstops, which when triggered signal the controller that the axis is approaching an end of travel. The controller may then reduce the axis speed and lower the peak torque capacity of the motor to avoid collision damage to the axis and increase positioning accuracy.

Figure 4A:
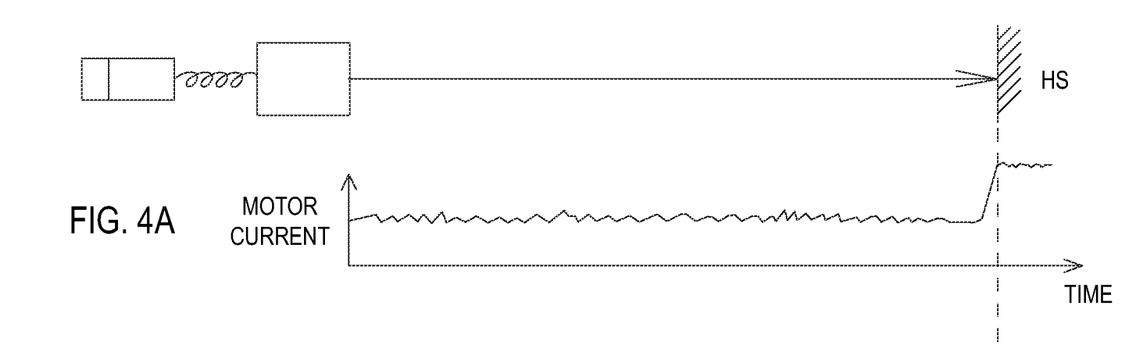
FIG. 4A is a chart illustrating the magnitude change pattern of the motor current during certain range of motion of an axis to a hardstop.
Figure 4B:
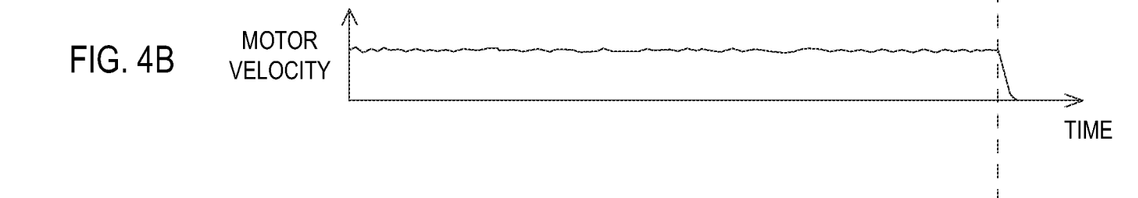
FIG. 4B is a chart illustrating the magnitude change pattern of the motor velocity during certain range of motion of an axis to a hardstop.

The motors 202, 302 are preferably a servo motor such as brush servo motors, brush-less servo motors, stepper motors, linear motors, servo-controlled dual-cylinder pneumatic/hydraulic drives, or any other suitable motors. Various motors are known in the art and their detail construction is not described herein to simply the description of the invention. The motors 202, 302 may be drivingly coupled to the load via various suitable means. For example in FIG. 2, a ball screw 203 may engage with the load 204 and be coupled to the motor 202 via a coupler. In operation the motor 202 may rotate the ball screw 203, which in turn translates the load 204 in a linear direction. In FIG. 3, a shaft 303 may engage with the load 304 e.g. via a bearing assembly and be coupled to the motor 302 via a coupler. The motor 302 rotates the shaft 303, which in turn rotates the load 304 in an angular direction. Other means of coupling known in the art may be used to transmit the driving force from the motor to the load. For example, timing belt, pulleys, rollers, nuts, guides and various other units may be used to drivingly couple the load to the motor. The motor's electrical parameters such as the motor current and back EMF etc., which can be monitored during the motion of the axis, may be affected when the axis contacts a hardstop. For example as shown in FIG. 4A, the motor current may maintain at a generally constant magnitude during certain range of motion of the axis before hitting a hardstop. There may be small variation of the current magnitude due to the non-uniform friction of the axis components such as screws, belts or bearings etc. The range of the variation can be ascertained when the axis is calibrated prior to the operation of the axis and stored in the controller for use in subsequent homing routines. When the axis hits the hardstop, the current magnitude will rise sharply as the motor draws increasingly high current in an attempt to further drive the axis against the hardstop. Such rise of the current magnitude may be somewhat gradual to an extent that depends on the flexibility between the axis components. Back EMF is a return voltage resultant of motor speed. It is a voltage that occurs in electrical motors where there is relative motion between the armature of the motor and the magnetic field. The back EMF will dramatically fall when the motor speed dramatically reduces as the axis hits the hardstop. Similarly, the motor rotation velocity may also be affected when the axis reaches a hardstop as shown in FIG. 4B. The motor velocity may maintain at a generally constant magnitude during certain range of motion of the axis before hitting a hardstop. There may be small variation of the velocity magnitude due to the non-uniform friction of the axis components and such variation can be ascertained prior to the operation of the axis and stored in the controller for use in subsequent homing routines. The motor velocity will drop sharply when the axis hits a hardstop, which is a fixed structural feature and would not be moved. Such drop of motor velocity may be somewhat gradual to an extent that depends on the flexibility of the axis components. The flexibility of the axis components can also be determined and stored in the controller.

The feedback devices 206, 306 may be relative or incremental feedback devices which track absolute positions over a short range of distance and the controller keeps track of the overall positions throughout the range of motion of the axis. The feedback devices 206, 306 may also be absolute feedback devices which have a distinct value for all positions within the full range of motion of the axis. The feedback devices 206, 306 can be any suitable encoders, resolvers, Hall sensors tachometers, or potentiometer. For example, the feedback devices 206, 306 can be optical encoders, magnetic encoders, transducer encoders such as resolvers or linear varying differential transducers (LVDT), and capacitive encoders. The feedback devices 206, 306 can be linear or rotary encoders, absolute or incremental encoders. Various encoders, resolvers, Hall sensors, tachometers and potentiometers are known in the art and commercially available and thus their detail construction is not described herein. In general, a rotary encoder is a position feedback device that sends a digital pulse as exact angular increments about a single revolution. An incremental encoder can also send an index pulse at every revolution at the same rotational angle of the device. A resolver is a rotary position feedback device that gives absolute position through one full revolution. The voltage value generated when a resolver is rotated to exactly 0 degree is called null voltage. A series of Hall sensors may be used e.g. in a brushless electric motor to detect the position of the permanent magnet. Hall sensors are typically used for motor commutation, but a system of Hall sensors, for the purpose of homing, can be considered a positioning device since it gives distinct position information of the motor per revolution. A tachometer is an analog device which returns an electrical signal (voltage) as proportional to rotation speed. A tachometer is a feedback for shaft rotational velocity. A potentiometer is an analog device which returns an electrical signal (resistance) as a function of rotation angle. A potentiometer is an angular positioning sensor. By way of example, when a feedback device such as an encoder or a resolver is coupled to a motor, the position of the rotating motor shaft can be ascertained and the position of the load connected to the motor shaft calculated by counting pulses or reading the voltages in the direction of rotation and tracking the revolutions of the encoder or resolver. For example, when a home or reference position has been established for an axis, the controller captures the angle of the feedback device and resets the device at the reference position. As the axis is commanded to move from the reference position, the controller receives subsequent pulses or voltage signals from the feedback device each of which corresponds to a predetermined unit change in angular or rotational position of the motor. As the axis includes a mechanism that translates the motor shaft rotation into linear or angular movement of the load, the current position of the load can be calculated based on the current angle of the feedback device and the total revolutions of the device tracked and recorded by the controller. It should be noted that a linear motor and a linear encoder or any combination of suitable motors and feedback devices can be used.

The controller 108 may include a memory, a processor, and an input and output (I/O) device or system as described above. The memory stores programs or algorithms including servo loop control algorithms and other programs for operation of various motion axes. Dimensional data of fixed structural features or hardstops in the radiation system may be provided to the controller and stored in the memory. For example, the value of distance between the hardstops for a linear axis, or the value of angle between hardstops for a rotational axis may be provided to and stored in the controller's memory. The dimensional data of the hardstops may be obtained by precise measurement during assembly of the system or typically provided by the manufacturer. The processor executes the programs and generates commands for operation of the motion axes. The controller receives signals from the feedback devices and sensors and sends signals such as voltage output to command the motor via the input and output (I/O) device or system.

The controller 108 may be programmed to execute a servo loop algorithm such as a torque control, velocity control or position control etc., and modify the current or voltage output to the motor based on the feedback from the feedback devices. For instance, based on the actual feedback position and the desired position of the motor or the load, the controller may produce a power output required to drive the motor or the load to a desired position. The controller may be programmed to monitor the magnitude change pattern of the motor's electrical parameters such as the motor current and back EMF etc. during the motion of the axis toward a hardstop, and compare the monitored value with a predetermined value stored in the controller. The controller may monitor current using electronic circuitry designed to allow direct reading of the current sent to the motor. The controller may also be programmed to monitor the motor feedback device or load feedback device during the motion of the axis toward a hardstop. The velocity of the motor or the load may be measured by monitoring back EMF or the feedback devices coupled to the motor or load and compared with a predetermined value stored in the controller. Various methods are known by which the controller can determine velocity from feedback devices. For example, when position-based feedback devices such as encoders, resolvers, a series of Hall sensors, or potentiometers are used, the controller may compute velocity from the position difference over a given time period. With velocity-based feedback devices such as a tachometer, the controller may compute velocity from the direct feedback value times a given proportionality constant. The controller can also determine velocity using the motor's electronic characteristic of back EMF. The controller may include electronic circuitry for determining both the voltage supplied to the motor and the return voltage. By comparing these voltages along with known motor constants, the controller can compute the motor velocity. In cases where the system includes limit switches which signal the controller that the axis is approaching its end of travel, the controller may also be programmed to reduce the axis speed and lower the peak torque capacity of the motor to avoid collision damage to the axis and improve the accuracy of measurement. The controller may be programmed to execute a homing routine as described in greater detail below to establish a home position for an axis and record the home position. The controller may capture signals from the feedback devices or sensors which are indicative of the current position of the motor or the load, and calculate the current position of the motor or the load with reference to the home position that has been established.

Figure 4C:
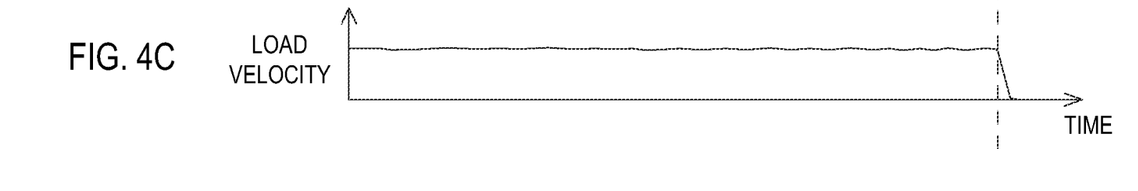
FIG. 4C is a chart illustrating the magnitude change pattern of the load velocity during certain range of motion of an axis to a hardstop.

In cases where a motion axis includes relative feedback devices which do not have an absolute position throughout the range of the axis motion, the controller does not know the current position of the axis when the system is powered up. Thus the controller needs to take the axis through a homing routine to establish a home or reference position for the axis when the power is applied the system. Once the reference position is established, the controller can then move the axis to accurate locations with reference to the home position. In one aspect the present invention provides a method of homing a motion axis in a radiation system in which the controller is programmed to command the axis to move slowly toward and gently contact a known hardstop. One principle of the provided homing method is that when an axis reaches or contacts a hardstop, the controller will note a change of the motor electrical parameters such as the motor current, back EMF etc. In the very first increase of the motor current for example, the controller may not determine whether the increase of the motor current is the result of hitting the hardstop or a normal variation caused by the non-uniform friction of the axis components such as the screws, timing belts, pulleys or bearings etc. If after a given period of time the controller notes a decrease of motor current from the rise, then the controller concludes that it is the non-uniform friction of axis components and not the hardstop that causes the increase of motor current. If, however, the motor current continues to rise sharply after a given period of time, then the controller concludes that the axis has hit a hardstop. FIG. 4A is a chart that illustrates the magnitude change pattern of the motor current during certain range of motion of the axis to a hardstop. Similarly, the controller may note a drop in back EMF during the motion of the axis. If after a given period of time the controller notes a rise of back EMF from the initial drop, then the controller concludes that it is the non-uniform friction of axis components and not the hardstop that causes the drop of back EMF. If, however, the back EMF continues to drop sharply after a given period of time, then the controller concludes that the axis has hit a hardstop. Another principle is that when an axis contacts a hardstop, the controller will note a decrease of the motor velocity, as measured by a feedback device. In the very first decline of the motor velocity, the controller may not determine whether the decline of the motor velocity is the result of hitting a hardstop or a normal variation caused by the non-uniform friction of the axis components such as the screws, timing belts, pulleys or bearings etc. Thus, the controller may increase the motor torque and continue to monitor the motor velocity. If the controller notes an increase of the motor velocity from the initial decrease, then the controller concludes that it is the non-uniform friction of the axis components and not the hardstop that causes the decrease of the motor velocity. If, however, the controller notes a sharp decline of the motor velocity after a given period of time even with the increase of motor torque, then the controller concludes that the axis has hit the hardstop. FIG. 4B is a chart that illustrates the magnitude change pattern of the motor velocity during certain range of motion of an axis to a hardstop. Alternative to monitoring a feedback device on the motor side, the controller may monitor the load feedback device. Similarly, the controller may note a decrease of the load velocity when the axis contacts the hardstop. In the very first decline of the load velocity, the controller may not determine whether the decline of the load velocity is the result of hitting the hardstop or a normal variation caused by non-uniform friction of the axis components. Thus, the controller may increase the motor torque and continue to monitor the load velocity. If the controller notes an increase of the load velocity from the initial decrease, then the controller concludes that it is the non-uniform friction of the axis components and not the hardstop that causes the decrease of the load velocity. If, however, the controller notes a sharp decline of the load velocity after a given period of time even with the increase of motor torque, then the controller concludes that the axis has hit hardstop. FIG. 4C is a chart that illustrates the magnitude change pattern of the load velocity during certain range of motion of an axis to a hardstop. In either case, the controller captures the position or angle of the feedback device when it detects that the axis has hit the hardstop and resets the feedback device. At this point, the axis has established the home or reference position. The controller commands the motor to stop the motion of the axis to avoid collision damages to the axis components. Subsequent motion away from the hardstop can be monitored by reading further signals from the feedback device.

Figure 5:
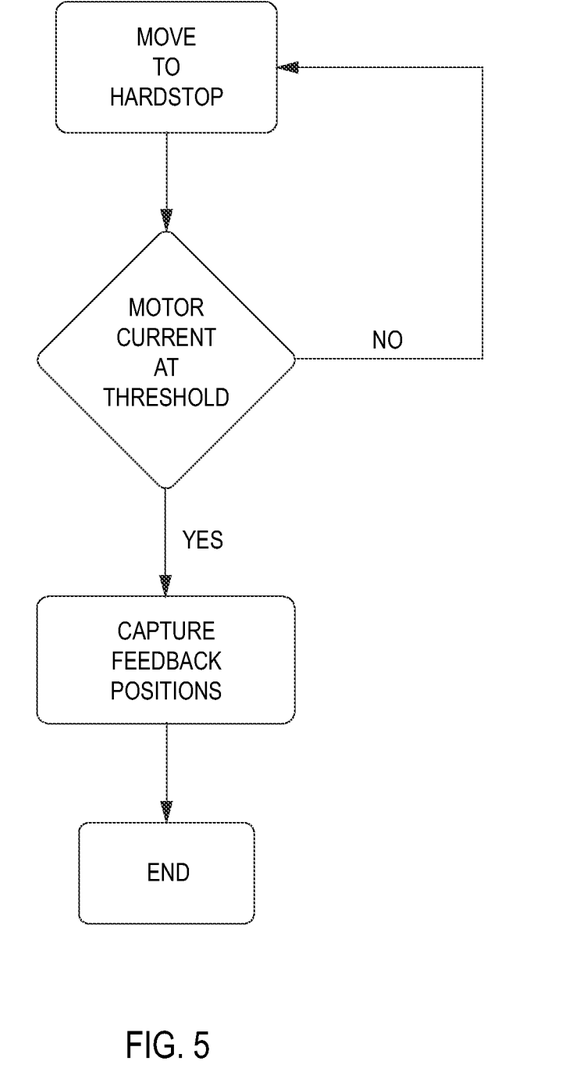
FIG. 5 is a flow chart illustrating an exemplary homing routine where the motor current is monitored in accordance with some embodiments of the invention.

Accordingly, in some embodiments the provided homing routine is performed by monitoring an electrical parameter of the motor such as the motor current or back EMF etc. as an axis moves toward a hardstop. Once the motor current reaches or exceeds a given value or threshold for a given duration of time, or once the back EMF drops to or below a given value or threshold for a given duration of time, the axis position is captured and the feedback device is reset. A home or reference position is defined based on the captured position of the feedback device. The frequency of monitoring the motor current or back EMF depends on the motion speed of the specifically designed axis and the controller's servo loop frequency. The given value or threshold of the monitored current or back EMF can be established prior to the homing routine. For example, prior to the homing routine the axis may be commanded to move in a safe travel range without hardstops or obstructions. Once the axis reaches a generally constant velocity without further acceleration, the motor current or back EMF is sampled and averaged. Preferably the velocity is the same velocity when used in the homing routine for the axis. The threshold or given value for the homing routine can be a value that is equal to or greater than the average value of the motor current obtained in the pre-homing routine, or a value equal to or greater than the maximal motor current sampled in the pre-homing routine without hardstop or obstruction. The non-uniform friction and flexibility of the axis components may be taken into consideration when setting the given value or threshold for the homing routine. FIG. 5 illustrates the general steps of the homing routine where the motor current is monitored during the motion of the axis. In implementation of the homing routine, the mechanical connection between the hardstop and the feedback device is preferably generally rigid or with minimal friction so that the detection of the hardstop location is consistent and thereby precise. Alternatively, if the flexibility and friction are known and consistent, then the above described hardstop homing techniques will still be successful and consistent with precision.

Figure 6:
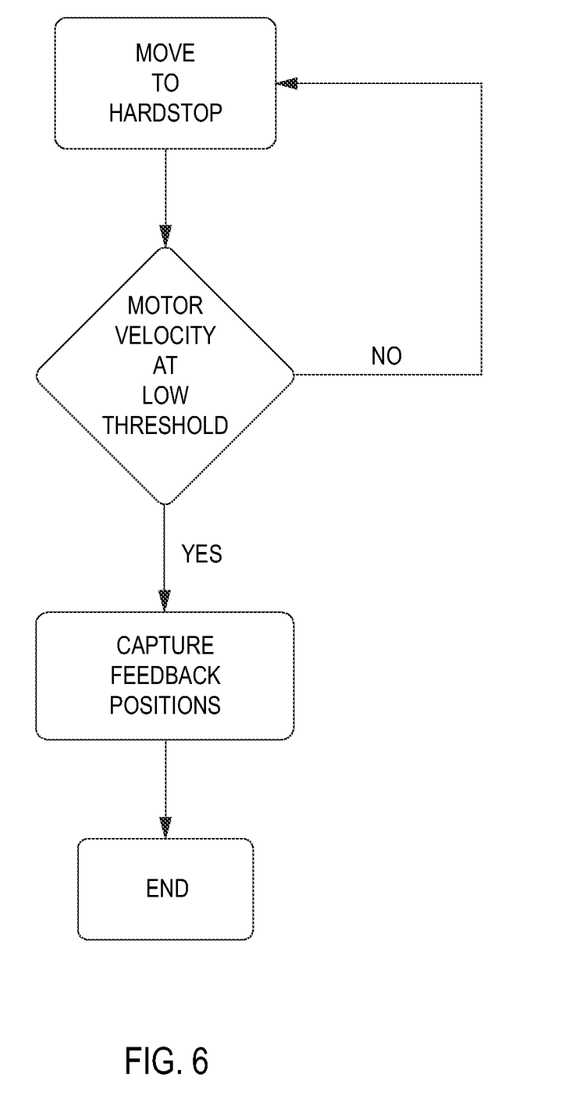
FIG. 6 is a flow chart illustrating an exemplary homing routine where the motor velocity is monitored in accordance with some embodiments of the invention.

In some embodiments, the provided homing routine is performed by monitoring the motor velocity as the axis moves toward a known hardstop. Once the motor velocity falls to or below a given value for a given duration of time, the axis position is captured and the feedback device is reset. At this point, the axis has established the home or reference position. Once this reference position is established, the axis may be commanded later to accurate locations. The frequency of monitoring the motor velocity depends on the motion speed of the specifically designed axis and the controller's servo loop frequency. The given value or threshold of the monitored motor velocity can be established prior to the homing routine by moving the axis in a safe travel range without hardstops or obstructions. Once the axis reaches a generally constant velocity without further acceleration, the motor velocity is sampled and averaged. The threshold or given value for the homing routine can be a value that is equal to or smaller than the average value of the motor velocity obtained in the pre-homing routine, or a value equal to or smaller than the minimal motor velocity sampled in the pre-homing routine. The friction and flexibility of the axis components may be taken into consideration when setting the given value or threshold for the homing routine. FIG. 6 illustrates the general steps of the homing routine where the motor velocity is monitored. In implementation of the homing routine, the mechanical connection between the hardstop and the feedback device is preferably generally rigid or with minimal friction so that the detection of the hardstop location is consistent and thereby precise. Alternatively, if the flexibility and friction are known and consistent, then the above described hard-stop homing techniques will still be successful and consistent with precision.

Figure 7:
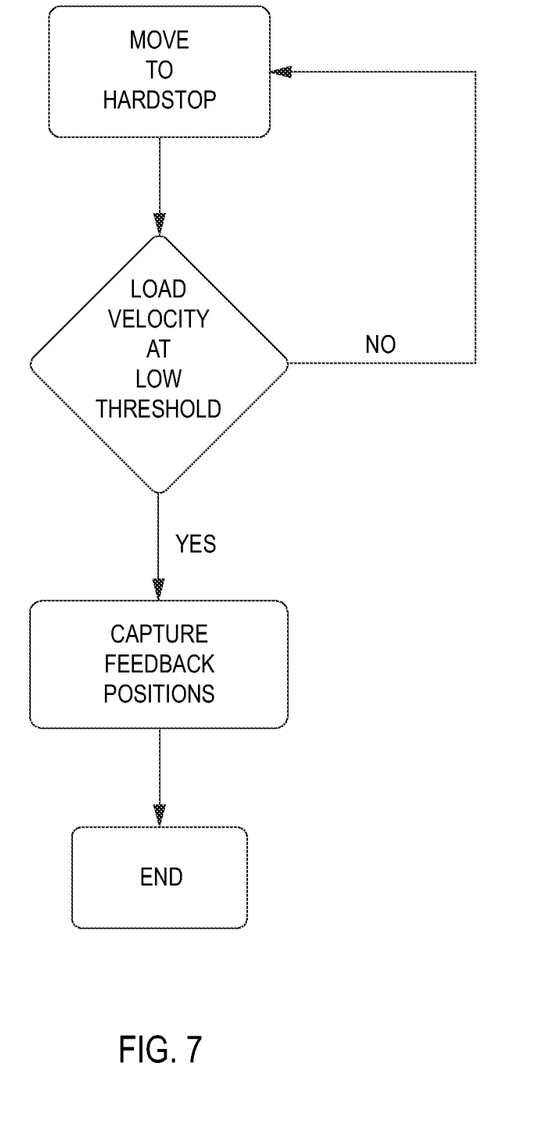
FIG. 7 is a flow chart illustrating an exemplary homing routine where the load velocity is monitored in accordance with some embodiments of the invention.

In some embodiments, the homing routine is performed by monitoring a secondary feedback device coupled to the load. When the axis moves toward a known hardstop the secondary feedback device is monitored. When the secondary feedback registers no motion for a given period of time, the axis position is captured and the feedback device is reset. Once this reference position is established, the axis may be commanded later to accurate locations. This routine is particularly useful for systems with flexibility or friction between the hardstop and motor mounted feedback devices. FIG. 7 illustrates the general steps of the homing routine where the load velocity is monitored.

For radiation therapy systems there are safety reasons to avoid single points of failure. If an axis component moves or a screw or an object causes a premature end-of-travel detection it is difficult to know whether a reference position established for an axis by a single homing routine is correct, thus causing a safety risk. Further, in conventional homing routines where the index pulses of a feedback device are captured and used as the reference positions, an incorrect reference determination caused by the moving of the index pulses would still not be detected as the distance between the index pulses would still agree with the historic value. Thus a checkout routine would be beneficial to verify that the correct home position was found during the homing routine. In cases where limit switches are used in a motion axis, a checkout routine would also verify the correct operation of the limit switches and that they have not moved beyond an acceptable range. According to one aspect of the invention, a home position can be verified by checking the range of travel of the axis defined by two hardstops. Since both hardstops can be captured with a very high precision, if the travel range does not match the provided range stored in the controller, then it is probable that the home position is wrong, or the axis has changed such that the travel range is too long (e.g. slipping) or too short (e.g. blocking).

Figure 8:
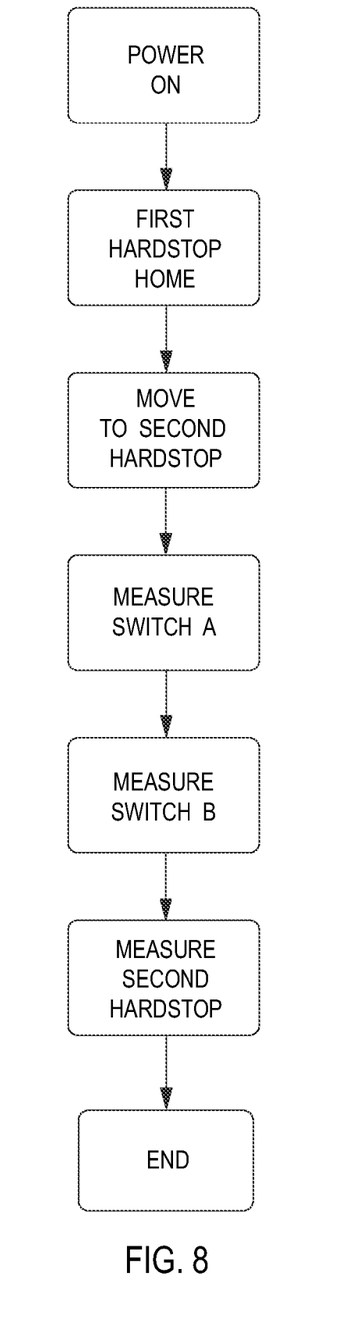
FIG. 8 is a flow chart illustrating an exemplary dual homing routine in accordance with some embodiments of the invention.

Accordingly, in one aspect of the invention a method for homing motion axes is provided in which two home positions are taken. Both of the home positions can be at hardstops the locations of which will not be changed during the life of the system. FIG. 8 illustrates the general steps of an exemplary dual homing routine in accordance with some embodiments. An axis is commanded to move to a first hardstop to perform a first homing routine. Preferably the first homing routine is a hardstop homing routine as described above. The controller monitors the motor's electrical parameter or the motor feedback device, or the load feedback device as the axis moves to the first hardstop. For example, once the motor current reaches or exceeds a given value for a given duration of time, the controller captures the axis position and establishes a first home position for the axis. Alternatively, if the motor or load velocity falls to or below a given value for a given duration of time as the axis moves to the first hardstop, the axis position is captured and a first home position for the axis is established.

The axis is then commanded to move in an opposite direction to a second hardstop to perform a second homing routine. Preferably the second homing routine is a hardstop homing as described above. The controller monitors the motor's electrical parameter or the motor feedback device, or the load feedback device as the axis moves to the second hardstop. For example, once the motor current reaches or exceeds a given value for a given duration of time, or once the motor velocity or load velocity falls to or below a given value for a given duration of time as the axis moves toward the second hardstop, the controller captures and records the axis current position, and a second home position for the axis is established.

The controller calculates the distance (in case of a linear axis) or the angle (in case of a rotational axis) between the first and second home positions based on the position or angle of the feedback devices captured during the first and second homing routines. The calculated value is then compared with a historic value of the distance or angle between the hardstops provided to and stored in the controller. As the hardstops are known fixed structural features the locations of which will not be changed during the life of the system, the historic value of the distance or angle between the hardstops can be precisely measured during the assembly of the axis or during an initial calibration routine for the axis. If the calculated value and the historic value agree then the homing routines are accepted. As used herein the term "agree" means that the calculated value and the historic value are same, or the difference between the calculated value and the historic value is within an acceptable error range.

As shown in FIGS. 2 and 3, an axis may optionally include one or more limit switches located near the hardstops. The limit switches, when triggered, signal the controller that the axis is approaching a hardstop. The controller may then reduces the axis speed and lower the peak torque capacity of the motor to avoid collision damage to the axis and increase positioning accuracy. The distances of the limit switches 212a and 212b to the first hardstop 210a is indicated as $d_A$ and $d_B$ respectively in FIG. 2 The value of $d_A$ and $d_B$ can be captured or set during an initial calibration routine and stored in the controller. During the duel homing routine, the limit switches are triggered when the axis moves passing the limit switches, and their positions are captured by the controller. The distances of the limited switches with respect to the established first home position, indicated as $d'_A$ and $d'_B$ respectively in FIG. 2, are calculated and compared with the historic values ($d_A$ and $d_B$) stored in the controller. If the calculated value and the stored historic value agree ($d_A=d'_A$ and $d_B=d'_B$), then the homing routines are accepted. As used herein the term "agree" means that the calculated value ($d'_A$ or $d'_B$) and the historic value ($d_A$ or $d_B$) are same, or the difference between the calculated value and the historic value is within an acceptable error range.

Returning to FIG. 1, a radiation system includes various motion axes that operate coordinately in production of treatment beams and positioning patients or other units for such as imaging. It would be desirable to establish a fixed reference frame for each axis. A fixed reference frame refers to a reference frame that is made to a structural feature or surface which will be constant throughout the life of the system. Establishment of a fixed reference frame for an axis enables servicing of the axis with replacement of a control component such as motor, drive, feedback devices or sensors without requiring a full system calibration. In the case of an energy switch for example, this means that the drive can be serviced without requiring re-tuning of each energy level of the accelerator guide. System calibration establishes or tunes in explicit positions of various functional devices in fixed reference frames. For example, a system calibration for a beam filter device determines the exact position of a photon flattening filter or electron scattering foil for the profile of a treatment beam. A system calibration for an energy switch determines the axis exact position for each accelerator guide energy level. Similarly an ion chamber and field light members have exact position requirements which need to be tuned in.

A homing routine establishes a consistent yet arbitrary reference position or reference frame for a motion axis when a system is powered on. The established reference frame is a relative reference frame which is resultant from the specific components and assembly of the axis. The adjustment of a reference position established in a homing routine to a fixed reference frame, a process referred to as axis calibration, would be beneficial for servicing the axis or for system calibration. In one aspect the present invention provides a method of establishing relative reference frames for motion axes which can be automatically calibrated with respect to their fixed reference frames. The designs for the motion axes are such and/or their relative reference frames are established such that the established relative reference frames are independent of their control components such as sensors, drives etc. A relative reference frame is established at a location where a part on the moving axis makes firm and predictable contacts with a fixed object or hardstop of the system.

Accordingly, in another aspect of the present invention a method of establishing relative reference frames for motion axes in radiation systems is provided. The axis is designed such that at least one fixed structural feature is provided in the system and a fixed reference frame is made with respect to the structure feature. The axis uses the fixed structural feature as an end-of-travel of the axis or as a hardstop for a homing routine. In establishing the relative reference frame, the axis is commanded to move toward the hardstop to perform a homing routine as described above. The controller monitors the motor's electrical parameters or the motor feedback device, or the load feedback device as the axis moves toward the hardstop. For example, once the motor current reaches or exceeds a given value for a given duration of time, the controller captures the position angle of the feedback device. Alternative to monitoring the motor current the controller may monitor the motor velocity or load velocity as the axis moves toward the hardstop. Once the motor or load velocity falls to or below a given value for a given duration of time, the controller captures the position angle of the feedback device. In either case, at the end of the hardstop homing a relative reference frame is established with the feedback device being reset as the origin of the reference frame. The captured position angle of the feedback device is the offset between the relative reference frame and the fixed reference frame of the axis. The relative reference frame is automatically calibrated with respect to the fixed reference frame since no human intervention is required during the axis calibration.

Figure 9:
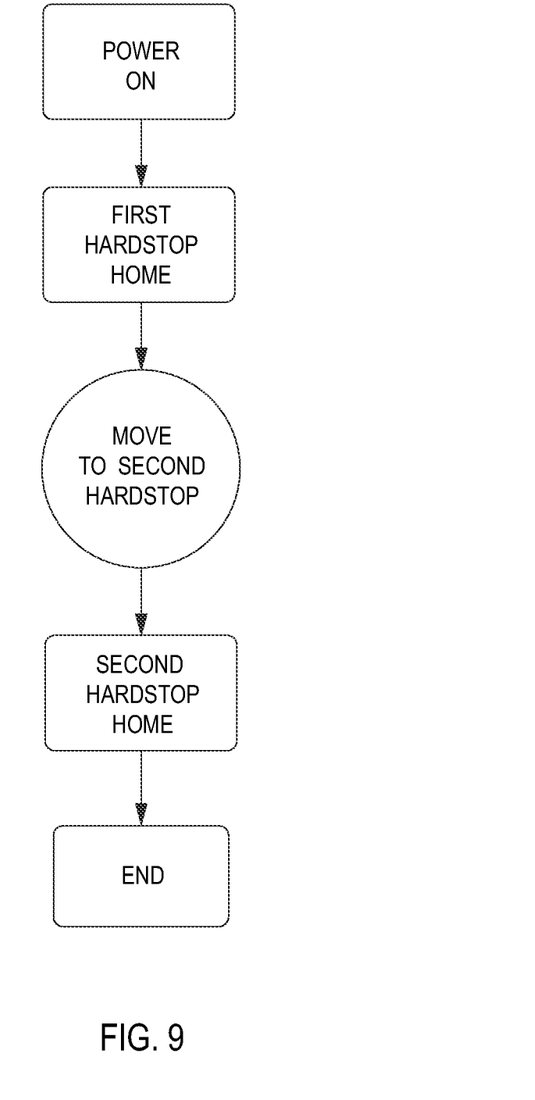
FIG. 9 is a flow chart illustrating an axis calibration routine in accordance with some embodiments of the invention.

FIG. 9 is a flow chart that illustrates the general steps of a home calibration routine or a checkout calibration routine. Before the calibration routine the system should be cleaned in order to prevent bad calibration due to particles or other obstructions. It would also be beneficial to re-run the calibration routine using the same steps and verify it agrees with the first calibration. This would ensure that the calibration process is correct and consistent. During the calibration routine the controller captures the position angles of the feedback device when it detects that the axis hits the hardstops and stores their values as reference. In case that the axis includes limit switches the controller also captures the positions of the limit switches and stores their values as reference. In the subsequent homing or dual homing routine for establishing a home position for the axis, the position angle of the feedback device is captured when the axis hits a hardstop and compared with the reference value stored in the controller. If the comparison shows that contacts of the axis with the hardstops are made within an acceptable distance to the axis calibration angle, the homing routine is accepted. In case that the axis includes limit switches, their positions are also captured in the homing or dual homing routine and compared with the reference value stored in the controller. If the captured value and the stored reference value agree, or the difference between the captured value and the stored value is within an acceptable error range, the homing routine is accepted.

A method and system for homing and establishing reference frames in radiation systems has been described. Those skilled in the art will appreciate that various other modifications may be made within the spirit and scope of the invention. All these or other variations and modifications are contemplated by the inventors and within the scope of the invention.

The invention claimed is:

1. A method of homing a motion axis including a motor, a load, and one or more feedback devices coupled to at least one of the motor and the load in a radiation system having at least two hardstops defining a range of travel of the motion axis, comprising:
providing a value of distance or angle between a first hardstop and a second hardstop;
moving the motion axis toward the first hardstop and contacting the motion axis with the first hardstop to perform a first homing routine, whereby a first reference position of the motion axis is established;
moving the motion axis toward the second hardstop and contacting the motion axis with the second hardstop to perform a second homing routine, whereby a second reference position of the motion axis is established;
calculating a value of distance or angle between the established first and the second reference positions;
comparing the calculated value of distance or angle between the established first and the second reference positions with the provided value of distance or angle between the first hardstop and the second hardstop; and
accepting the first and second reference positions for the motion axis if the calculated value and the provided value agree.

2. The method of claim 1 wherein the radiation system further comprising one or more limit switches near the first or second hardstop, and the method further comprising providing a value of distance or angle of the one or more limit switches from the first or second hardstop, capturing a position of the one or more limit switches during the first or second homing routines, calculating a value of distance or angle between the captured position of the one or more limit switches and the established first or second reference position, comparing the calculated value of the one or more limit switches with the provided value of the one or more limit switches, and accepting the first and second reference positions for the motion axis if the calculated value of the one or more limit switches and the provided value of the one or more limit switches agree.

3. The method of claim 1 wherein the first and second homing routines comprising monitoring an electrical parameter of the motor which reaches or exceeds a determined value when the axis contacts the first and second hardstops, capturing a value of at least one of the one or more feedback devices when the monitored electrical parameter reaches or exceeds the determined value, and defining the first and second reference position for the motion axis based on the captured value of the at least one of the one or more feedback devices.

4. The method of claim 1 wherein the first and second homing routines comprising monitoring the motor velocity which falls to or below a determined value when the axis contacts the first and second hardstops, capturing a value of at least one of the one or more feedback devices when the monitored motor velocity falls to or below the determined value, and defining the first and second reference position for the motion axis based on the captured value of the at least one of the one or more feedback devices.

5. The method of claim 1 wherein the first and second homing routines comprising monitoring the load velocity which falls to or below a determined value when the axis contacts the first and second hardstops, capturing a value of at least one of the one or more feedback devices when the monitored load velocity reaches or exceeds the determined value, and defining the first and second reference position for the motion axis based on the captured value of the at least one of the one or more feedback devices.

6. The method of claim 1 wherein the load comprises an energy switch assembly, a target assembly, a filter positioning device assembly, an ion chamber assembly, or a collimation assembly.

7. The method of claim 1 wherein the load comprises a treatment couch top, a treatment couch base, or a positioning device for imaging.

8. The method of claim 1 wherein the motion axis is a linear axis and the provided value and the calculated value are a value of distance between the first and second hardstops.

9. The method of claim 1 wherein the motion axis is a rotational axis and the provided value and the calculated value are a value of angle between the first and second hardstops.

* * * * *